July 20, 1937.     A. L. PARKER     2,087,356
VALVE CONTROL MECHANISM
Filed May 4, 1936     2 Sheets-Sheet 1
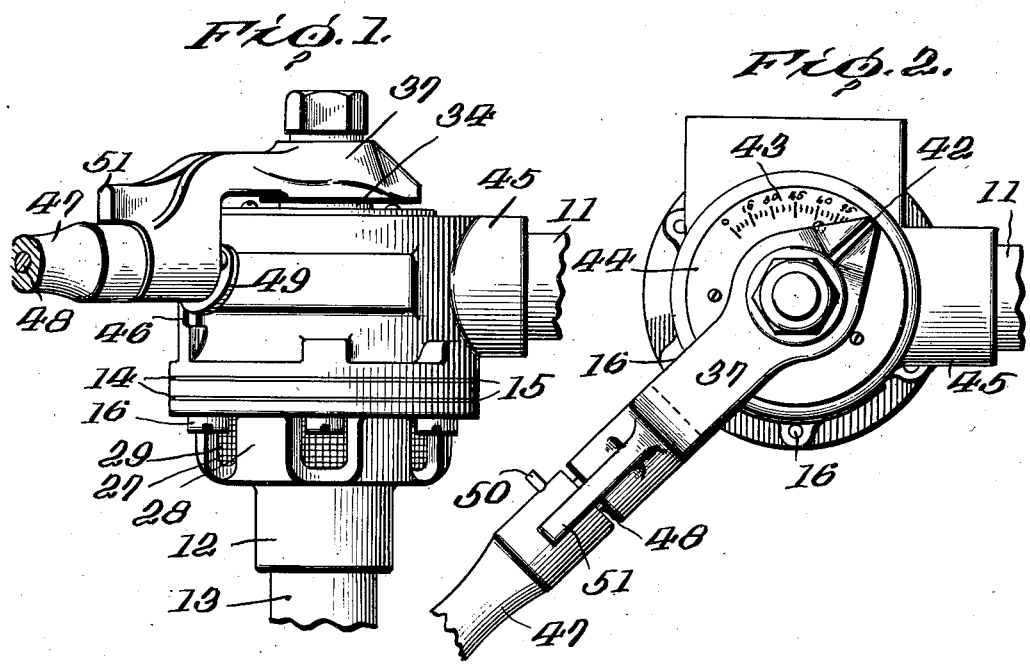
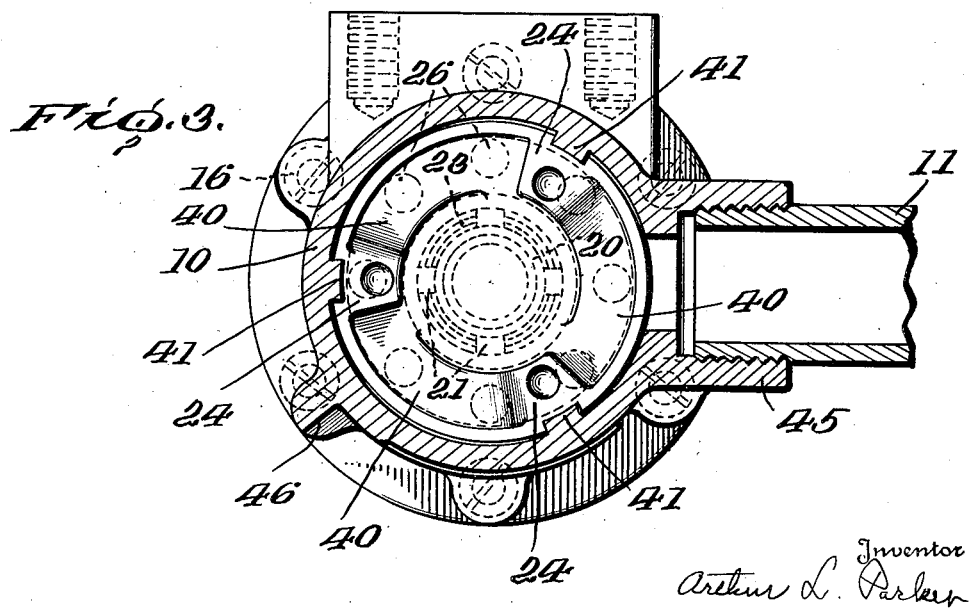

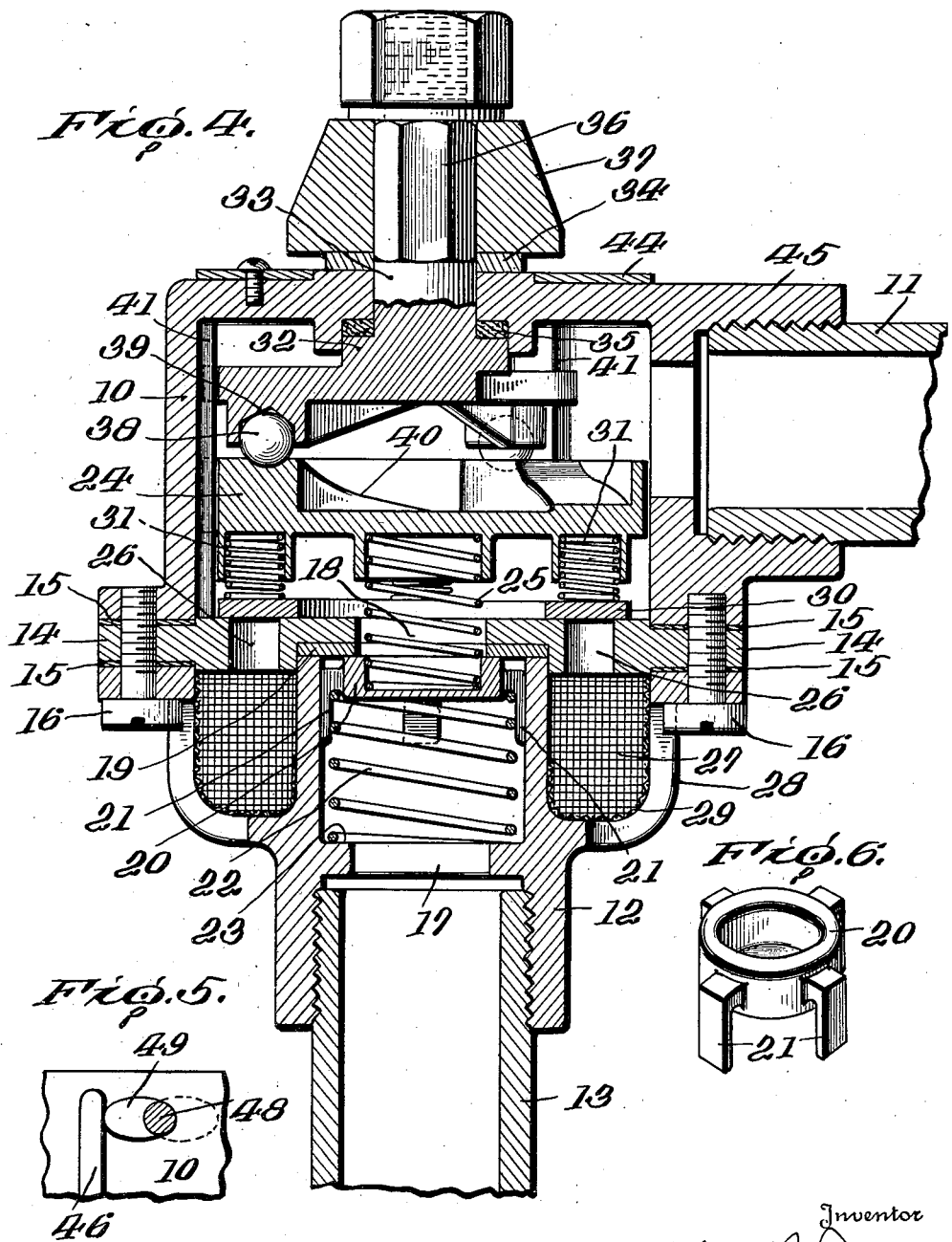

Patented July 20, 1937

2,087,356

UNITED STATES PATENT OFFICE 2,087,356

VALVE CONTROL MECHANISM

Arthur L. Parker, Cleveland, Ohio

Application May 4, 1936, Serial No. 77,843

8 Claims. (Cl. 303—54)

This invention relates to an improved valve control mechanism primarily adapted to be used in connection with a pneumatic system in which variations of pressure are necessary. For example, in a vacuum controlled braking system, the amount of pressure applied to the brakes depends upon the difference in pressure between opposite ends of the brake cylinder and, in order to get the desired braking effect, it is necessary to vary the degree of vacuum in one end of the cylinder, while the other end is either at atmospheric pressure or constantly connected to the source of vacuum.

With the above conditions in mind, it is the primary object of the present invention to provide an improved valve control mechanism adapted to be interposed in a pipe line, which is connected at one end to a source of vacuum, said mechanism being operable at will to establish the desired differential between opposite ends of the line.

Another object of the invention is to provide a variable stop, which may be quickly and easily manipulated to vary the maximum differential to be established.

The invention will be particularly described in connection with the accompanying drawings, which illustrate the preferred form thereof and in which,—

Figure 1 is a side elevation of the invention.

Figure 2 is a plan view thereof.

Figure 3 is a horizontal section taken on a plane immediately above the valve control cam.

Figure 4 is a central longitudinal sectional view.

Figure 5 is a detail view of the variable stop.

Figure 6 is a perspective view of the vacuum valve disk.

As illustrated in the drawings, my improved control mechanism comprises a body 10 adapted to be connected to a pipe 11 and a cap 12 adapted to be connected to a pipe 13. A plate 14 with gaskets 15 is interposed between the cap 12 and the body 10, which are secured together by screws 16 or the like. The cap 12 has a central orifice 17 leading into the pipe 13 and the plate 14 has a central orifice 18, about which is a washer 19, seated between the plate and the cap.

A vacuum valve disk 20 is formed with arms 21, by which it is guided for reciprocation within the cap 12, and is adapted to be closed against the washer 19 by the pressure of a coil spring 22, which seats against an internal annular shoulder 23. An adjusting cam member 24 is located centrally of the body 10 and a coil spring 25, acting between the cam member 24 and the vacuum valve disk 20, urges the latter toward open position in opposition to the action of the spring 22.

The plate 14 is formed with a series of atmospheric ports 26 leading from an annular chamber 27 in the cap 12, which is defined by upturned arms 28. The chamber 27 is preferably lined by a sieve or air strainer 29. The ports 26 are adapted to be closed by an annular air inlet valve 30 under pressure from coil springs 31, which are seated against the adjusting cam member 24.

In order to adjust the cam member 24 downwardly to increase the tension of the springs 25 and 31, a hub 32 is secured or integrally connected to a spindle 33, which is rotatably mounted in the wall of the body 10 and provided with washers 34 and 35 above and below the same. The spindle is also formed with a non-circular head 36, to which an arm 37 is suitably secured. The hub 32 is provided with cam balls 38, which are mounted in recesses 39 and are adapted to travel over the cam surfaces 40 of the member 24 as the arm 37 is moved to the right or left. To prevent rotation of the member 24, it is splined at 41 to the body 10.

As illustrated in Figure 2, the arm 37 is movable within a range of approximately 90° and its position is indicated by a pointer 42 associated with a scale 43 inscribed upon a plate 44, which is secured to the body 10. The movement of the arm 37 is limited in one direction by the boss 45 and in the other direction by the shoulder 46.

Under certain conditions, as hereinafter explained, it is desirable to shorten the range of movement of the arm 37. For this purpose, the hand grip 47 is carried by a spindle 48, which is rotatably mounted in the arm 37. The inner end of the spindle 48 carries a cam 49 which is adapted to engage the stop 45 or 46 in limiting the position of the arm 37. The rotation of the cam 49 and spindle 48 in the arm 37 is limited by the engagement of a pin 50 on the handle 47 with a lug 51 on the end of the arm. With the cam 49 in the full line position shown in Figure 5, the range of the arm 37 is shortened in one direction and with the cam in the dotted line position, the range is shortened in the opposite direction.

In the operation of the invention, assuming that the pipe 13 is connected to the source of vacuum, if the arm 37 is positioned so that the balls 38 are at the low points of the cam surfaces 40, the spring 25 will be under minimum compression and the vacuum will not be sufficient to open the valve 20. At the same time, the springs 31 are under minimum compression and permit atmospheric air to flow past them into the pipe 11 until the latter is substantially at atmospheric pressure. If the pipe 11 is connected to one end of the brake cylinder, therefore, while the other end of the cylinder is connected to the source of vacuum, it is obvious that maximum pressure will be applied to the brakes. Now, if the arm 37 is moved to the right until the balls 38 are on the high points of the cam surfaces 40, as shown in Figure 4, the springs 31 will be under maximum compression and will hold the air inlet valve 30 closed, while the spring 25, also under maximum compression, will open the vacuum valve 20, permitting air to escape from the pipe 11, until the vacuum therein and in the adjacent end of the brake cylinder is substantially equal to the vacuum in the opposite end of the cylinder. The brakes will then be released. With different intermediate settings of the arm 37, the brakes, of course, will be applied with different pressures as desired by the operator.

If the valve control mechanism is used in a system, in which one end of the brake cylinder is open to the atmosphere, instead of being connected to the source of vacuum, the effect on the brakes if of course reversed. That is, maximum pressure on the springs 25 and 31 will set the brakes and minimum pressure on these springs will release the brakes, so that the calibration on the plate 44 would in that case be reversed.

In the application of the invention to either type of brake cylinder, it is desirable at times to lessen the amount of maximum pressure to be applied to the brakes. For example, if the system is applied to a trailer, it is not generally advisable to apply the full braking power when the trailer has a light load. In that case, the rotatable hand grip with the cam 49 provides a very convenient and readily manipulated means to stop the throw of the arm 37 before it reaches maximum braking position. However, if the cam is set in this way for a light load and the operator for any reason wishes to use the full braking power, he may by a simple turn of the wrist reset the cam so that it will permit the maximum throw of the arm 37.

While I have shown and described in detail the present preferred form of the invention, it is to be understood that this is merely for the purpose of illustration and that the invention includes such modifications as may fall within the scope of the appended claims.

Having thus described the invention, what I claim as new and desire to secure by Letters Patent is:—

1. In a device of the character described, the combination with a vacuum valve adapted to be exposed on one side to a source of vacuum, and a spring tending to close the valve in opposition to the pull of the vacuum, of an atmospheric valve, means normally holding the atmospheric valve closed by pressure, and means to relieve such pressure to admit atmospheric air to the opposite side of the vacuum valve and at the same time to increase the effectiveness of the vacuum valve closing spring.

2. In a device of the character described, the combination with a vacuum valve adapted to be exposed on one side to a source of vacuum, and a spring tending to close the valve in opposition to the pull of the vacuum, of a second spring tending to open the valve, an atmospheric valve, means normally holding the atmospheric valve closed by pressure, and means to relieve such pressure to admit atmospheric air to the side of the vacuum valve away from the source of vacuum and at the same time to relieve the tension of the second spring.

3. In a device of the character described, the combination with a vacuum valve adapted to be exposed on one side to a source of vacuum, and a spring tending to close the valve in opposition to the pull of the vacuum, of a chamber on the opposite side of the valve with air ports leading thereto, a valve for the air ports, a second spring tending to open the vacuum valve, springs tending to close the air valve, and means for simultaneously relieving the tension of the second and last mentioned springs.

4. In a device of the character described, the combination with a vacuum valve adapted to be exposed on one side to a source of vacuum, and a spring tending to close the valve in opposition to the pull of the vacuum, of a chamber on the opposite side of the valve with air ports leading thereto, a valve for the air ports, a second spring tending to open the vacuum valve, springs tending to close the air valve, and cam means movable through different stages to cause simultaneous and similar variations in the tension of the second and last mentioned springs.

5. In a device of the character described, the combination with a vacuum valve adapted to be exposed on one side to a source of vacuum, and a spring tending to close the valve in opposition to the pull of the vacuum, of a chamber on the opposite side of the valve with air ports leading thereto, a valve for the air ports, springs tending to close the air valve, and means for simultaneously opening the vacuum valve and increasing the tension of the air valve springs.

6. In a device of the character described, the combination with a valve and spring means tending to hold the same closed against a differential of pressure on opposite sides thereof, of means including an arm movable about a pivot to progressively vary the total effect of said spring means, stops to limit the pivotal movement of said arm, a hand grip on said arm, and a cam secured to said grip and engageable with said stops, said hand grip being movable to adjust the cam and thereby adjust the range of movement of said arm.

7. The combination with a chamber having a port, a valve adapted to cover said port, spring means tending to close said valve, another spring means tending to open it, said chamber having an atmospheric port, a valve adapted to cover the atmospheric port, a third spring means tending to close the atmospheric valve, and means for simultaneously increasing or decreasing the tension of the second and third spring means.

8. The combination with a chamber having a port, a valve adapted to cover said port, spring means tending to close said valve, a second spring means tending to open it, said chamber having an atmospheric port, a valve adapted to cover the atmospheric port, a third spring means tending to close the atmospheric valve, a cam member against which the second and third spring means are seated, and means for moving the cam member to vary the tension of the spring means seated thereon.

ARTHUR L. PARKER.